United States Patent
Morovic et al.

(10) Patent No.: US 10,346,100 B2
(45) Date of Patent: Jul. 9, 2019

(54) ERROR DIFFUSION

(71) Applicant: Hewlett-Packard Development Company, L.P., Houston, TX (US)

(72) Inventors: Peter Morovic, Sant Cugat del Valles (ES); Jan Morovic, Colchester (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/764,198

(22) PCT Filed: Jan. 29, 2016

(86) PCT No.: PCT/EP2016/051934
§ 371 (c)(1),
(2) Date: Mar. 28, 2018

(87) PCT Pub. No.: WO2017/129254
PCT Pub. Date: Aug. 3, 2017

(65) Prior Publication Data
US 2018/0307443 A1    Oct. 25, 2018

(51) Int. Cl.
*G06F 3/12* (2006.01)
*H04N 1/52* (2006.01)
*B33Y 50/00* (2015.01)

(52) U.S. Cl.
CPC ............ *G06F 3/1208* (2013.01); *B33Y 50/00* (2014.12); *G06F 3/1219* (2013.01); *G06F 3/1254* (2013.01); *H04N 1/52* (2013.01)

(58) Field of Classification Search
None
See application file for complete search history.

(56) References Cited

U.S. PATENT DOCUMENTS

| 5,243,443 A | 9/1993 | Eschbach |
| 5,473,446 A * | 12/1995 | Perumal, Jr. ............ H04N 1/52 358/502 |

(Continued)

FOREIGN PATENT DOCUMENTS

| CN | 103460226 | 12/2013 |
| EP | 0707415 | 4/1996 |

(Continued)

OTHER PUBLICATIONS

Zhou, Chi et al. "Three-dimensional digital halftoning for layered manufacturing based on droplets." Transactions of the North American Manufacturing Research Institution of SME 37 (2009): 175-182.

(Continued)

*Primary Examiner* — Anh-Vinh T Nguyen
(74) *Attorney, Agent, or Firm* — HP Inc. Patent Department

(57) ABSTRACT

In an example, a method includes identifying, within data for use in printing, a first element set associated with a first print addressable area. The first element set may include at least one element, and each element of the set may be associated with a print material or print material combination. An element may be selected from the first element set and assigned to the first print addressable area. A second print addressable area may be identified as a candidate print addressable area for error diffusion, the second print addressable area being associated with a second element set. Any common elements of the first element set and the second element set may be identified and, if at least one common element is identified, an error associated with the selection of the element from the first element set may be diffused to the at least one common element.

15 Claims, 2 Drawing Sheets

(56) References Cited

U.S. PATENT DOCUMENTS

| | | | |
|---|---|---|---|
| 5,657,137 A * | 8/1997 | Perumal, Jr. | H04N 1/52 |
| | | | 347/43 |
| 6,081,344 A | 6/2000 | Bockman et al. | |
| 6,282,323 B1 * | 8/2001 | Tanaka | H04N 1/405 |
| | | | 358/1.9 |
| 6,671,068 B1 | 12/2003 | Chang et al. | |
| 7,050,194 B1 * | 5/2006 | Someno | H04N 1/3876 |
| | | | 358/1.1 |
| 7,542,170 B2 | 6/2009 | Chen et al. | |
| 8,208,175 B2 | 6/2012 | Xu et al. | |
| 8,760,725 B1 | 6/2014 | Keithley | |
| 8,958,114 B2 * | 2/2015 | Abello | H04N 1/1903 |
| | | | 347/116 |
| 2002/0003633 A1 * | 1/2002 | Matsumoto | H04N 1/40 |
| | | | 358/2.1 |
| 2005/0212816 A1 | 9/2005 | Chang | |
| 2005/0270583 A1 * | 12/2005 | Velde | H04N 1/4052 |
| | | | 358/3.03 |
| 2012/0013950 A1 * | 1/2012 | Saka | H04N 1/233 |
| | | | 358/3.03 |
| 2012/0047418 A1 * | 2/2012 | Nakagawa | H04N 1/405 |
| | | | 714/766 |
| 2015/0224716 A1 * | 8/2015 | Hemani | B29C 64/386 |
| | | | 700/98 |
| 2016/0142568 A1 * | 5/2016 | Nakamura | G06F 3/1298 |
| | | | 358/1.15 |
| 2017/0087869 A1 * | 3/2017 | Suzuki | B41J 2/2103 |
| 2017/0359485 A1 * | 12/2017 | Shimada | B41J 2/451 |
| 2018/0039871 A1 * | 2/2018 | Jang | G06K 9/4652 |
| 2018/0056582 A1 * | 3/2018 | Matusik | B33Y 10/00 |
| 2018/0262649 A1 * | 9/2018 | Shimada | H04N 1/6058 |

FOREIGN PATENT DOCUMENTS

| | | |
|---|---|---|
| JP | 08237482 | 9/1996 |
| JP | 2002368999 | 12/2002 |
| JP | 2005318549 | 11/2005 |
| JP | 2015044299 | 3/2015 |

OTHER PUBLICATIONS

Haneishi, Hideaki, et al. "Color digital halftoning taking colorimetric color reproduction into account." Journal of Electronic Imaging, vol. 5, No. 1 (1996): 97-107.

Kwak, Nae-Joung et al. "Edge-enhanced error diffusion halftoning using human visual properties." Hybrid Information Technology, ICHIT'06. International Conference on. vol. 1, IEEE, Nov. 9-11, 2006, pp. 499-504.

* cited by examiner

ERROR DIFFUSION

BACKGROUND

Printing systems may convert input data (for example, data representing an image for two-dimensional printing, or data representing an object for three dimensional printing) to print control data, which specifies where print materials (for example, colorants such as inks or toners or other printable materials) are to be placed in a print operation.

Techniques used in converting data include error diffusion, in which a particular print material or material combination is assigned from a selection of possible print materials and/or material combinations for a given location. For example, a print material may be selected such that a drop of a particular color ink will be placed at a particular pixel to form an image. An 'error' associated with selecting this or these print materials and not another of the possible print material(s) is distributed to at least one other location, usually reducing the probability of the same print material(s) being assigned to the other location(s).

BRIEF DESCRIPTION OF DRAWINGS

For a more complete understanding, reference is now made to the following description taken in conjunction with the accompanying drawings in which.

DETAILED DESCRIPTION

Figure 1:
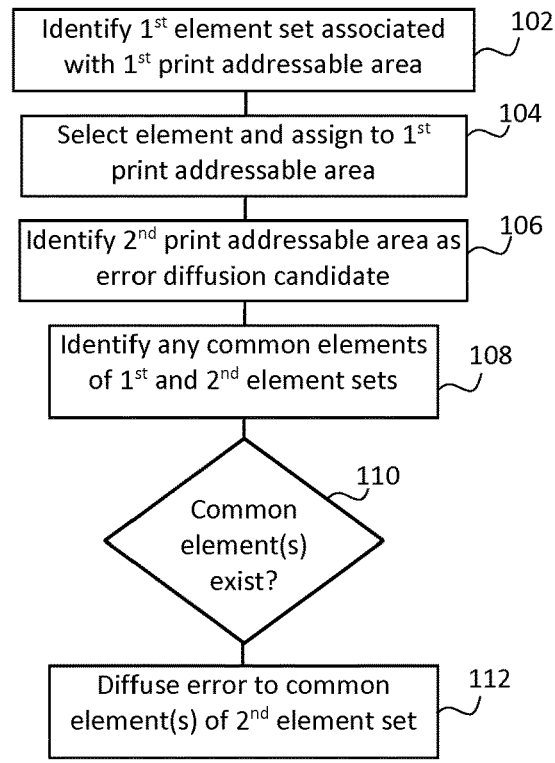
FIG. 1 is a flowchart of an example method of error diffusion.

FIG. 1 shows a method, which may be implemented on any suitable any processor or processing apparatus (e.g., computer), and which may be a method of processing data for use in printing using error diffusion techniques. In some examples, the method may be carried out on data for use in printing which may for example comprise data representing an image intended to be printed in two-dimensional printing, or data representing an object to be generated in three dimensional printing.

In block 102, a first element set associated with a first print addressable area is identified within data for use in printing. The first element set comprises at least one element, wherein each element of the element set is associated with a print material or print material combination.

For example, in the case of two dimensional printing, a print addressable area may comprise at least one pixel, and the element set may comprise colorants such as inks (for example cyan, magenta, yellow and black inks), coatings or other print materials, as well as combinations of those colorants (for example, cyan over printed with magenta), coatings, etc.

In the case of three dimensional printing, which is also referred to as additive manufacturing, three-dimensional space may be characterised in terms of 'voxels', i.e. three-dimensional pixels, wherein each voxel occupies or represents a discrete volume. In examples of three dimensional printing therefore, an addressable area may comprise at least one voxel and the set of elements may comprise one or a combination of agents and/or build materials.

To briefly discuss three-dimensional printing in greater detail, objects generated by an additive manufacturing process may be formed in a layer-by-layer manner. In one example, an object is generated by solidifying portions of layers of build material. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used to solidify a build material. In other examples, three-dimensional objects may be generated by using extruded plastics or sprayed materials as build materials, which solidify to form an object. Some processes that generate three-dimensional objects use control data generated from a model of a three-dimensional object. This control data may, for example, specify the locations at which to apply an agent to the build material, or where a build material itself may be placed, and the amounts to be placed. The control data may be generated from a 3D representation of an object to be printed. Locations may be expressed in terms of voxels. A voxel at a given location may have at least one characteristic. For example, it may be empty, or may have a particular color or may represent a particular material, or a particular object property, or the like. In general, the voxels of an object may have the same shape (for example, cubic or tetrahedral), or may differ in shape and/or size. However, where the term voxel is used herein to refer to a print addressable area, the voxel size may be determined at the print resolution of a print apparatus, i.e. it may correspond to a volume which can be individually addressed by a print apparatus (which may be a particular print apparatus, of a class of print apparatus, or the like).

It may be that print materials are specified explicitly within an element set, i.e. at least one of the set of elements is in effect a set of print materials and/or print material combinations. In other examples, it may be that at least one of the elements relates to other qualities, which may in turn be related to print materials. For example, the elements may specify a property or the like which can be mapped to print materials. In another example, a color may be specified in terms of a Neugebauer Primary (a set of the colors (and in some examples, the number of drops of ink) which can be applied by a particular print apparatus), which in turn may have predetermined mappings to colorants.

In some examples, the set of elements is expressed as a print material coverage representation which defines print material data, for example detailing (explicitly or implicitly, for example via a mapping) the amount of print materials (such as a colorant or coating for two dimensional printing or an agent(s) to be deposited onto a layer of build material, or in some examples, build materials themselves for three dimensional printing), and, if applicable, their combinations. Such print materials may be related to or selected to provide an image or object property such as, for example, color, transparency, flexibility, elasticity, rigidity, surface roughness, porosity, conductivity, inter-layer strength, density, and the like.

For example, a print addressable location within input data (for example, a pixel in image data or a voxel in object model data) may be associated with one or a set of print material coverage representations, for example comprising a set of print material coverage vectors. In the case of two dimensional printing, these may be referred to as area coverage vectors. For example, the vectors may comprise ink vectors, which specify proportions of inks to be applied (and may therefore be thought of as native to a printer) or Neugebauer Primary Area Coverage vectors (NPac vectors, or simply NPacs), which may specify colors in a manner which may be associated with inks or other colorants via a mapping (for example, using a look up table). By analogy, in three dimensional printing, Material Volume coverage vectors (termed Mvoc vectors, or simply MVocs, herein) may be defined. Such vectors provide probability that a print material may be applied in a location. In a simple case, such a vector may indicate that X % of a given region should have a particular print material applied thereto, whereas (100–X) % should be left clear of the print material. In practise, this may be resolved at the addressable resolution for the print material and/or printing device. Therefore, if there are N×M addressable locations in an XY plane, X % of these locations may receive a print material, while (100–X) % do not.

Such a print material coverage representation may provide a plurality of values, wherein (at least initially) each value defines a probability for each, or each combination of print materials in an addressable location. For example, in a printing system with two available print materials (for example, inks, coatings or agents)—M1 and M2, where each print material may be independently deposited in an addressable area (e.g. voxel or pixel), there may be $2^2$ (i.e. four) probabilities in a given material coverage vector: a first probability for M1 without M2; a second probability for M2 without M1; a third probability for an over-deposit (i.e. a combination) of M1 and M2, e.g. M2 deposited over M1 or vice versa; and a fourth probability for an absence of both M1 and M2. In this example, it is assumed that a drop of print material may be applied or not: this a binary choice and the value for each agent may be either 0 or 1. In this case, a coverage vector may be: [M1, M2, M1M2, Z] or with example probabilities [M1:0.2, M2:0.2, M1M2: 0.5, Z:0.1]—in a set of print addressable locations (e.g. and [x, y] or an [x, y, z] location (which in some examples may be a [x, y] location in a z slice)) to which the coverage vector applies, 20% of locations are to receive M1 without M2, 20% are to receive M2 without M1, 50% are to receive M1 and M2 and 10% are to be left clear. As each value is a proportion and the set of values represent the available material combinations, the set of values in each vector sum to 1 or 100%.

Such a print material coverage vector therefore specifies a plurality of elements which are related to print materials, and a probability for each element which is represented as a value between 0 and 1.

In block 104, the method continues by selecting an element from the first element set and assigning the element to the first print addressable area. In examples therefore, a particular print material or print material combination may be assigned to a pixel or a voxel, for example to be used in control data for printing that pixel/voxel. In some examples this may comprise selecting the element associated with the highest probability (in the example above, a combination of M1 and M2). If there are two elements have a joint highest probability, one may be selected, for example at random. In other examples, an initial value may be selected in some other way.

Block 106 comprises identifying a second print addressable area as a candidate print addressable area for error diffusion. In this example, the second print addressable area is associated with a second element set (for example implemented as a print material coverage representation such as an NPac or Mvoc vector). In some examples, the error diffusion candidate print addressable area may be a relatively near spatial neighbor of the first print addressable area, for example, an adjacent area which shares an edge or a face with the first print addressable area, or which shares a corner.

In block 108, any common elements of the first element set and the second element set are identified and, if it is determined, in block 110, that there is at least one common element, in block 112, an error associated with the selection of the element from the first element set is diffused to the identified common elements of the second element set.

In examples in which the elements sets are material coverage vectors (for example, ink vectors, NPacs, Mvocs or the like), diffusing the error may comprise determining an error vector based on the first material coverage vector and the assigned element, the error vector having the first element set (i.e. the element set of the first addressable area) and transforming the second material coverage vector to an error diffused material coverage vector by combining the values of the common elements of the error vector and the second material coverage vector, the error diffused material coverage vector having the second element set.

To consider a particular example, if a first pixel at a location [x, y] is associated with an NPac vector expressed as:

[NP1 0.2; NP2 0.5; NP3 0.3].

then the NP with largest area coverage, NP2 may be selected from the NPac and an error vector computed as the difference of the original NPac less an NPac with the single NP which is selected; in this case:

[NP1 0.2; NP2 0.5; NP3 0.3]–[NP2 1]=[NP1 0.2; NP2 –0.5; NP3 0.3].

In other words, the error vector is determined by subtracting a vector having the first element set in which the selected element has a value of 1 and the other elements have a value of 0 from the first material coverage vector.

This error is not diffused 'fully', but instead is diffused to the extent that the set of elements of the first and the second print addressable areas coincide. In other words, the error is diffused to the common elements and not to the elements which present in just one of the first and second element sets.

Assume for the purpose of example that the second print addressable area is initially associated with an NPac of the form:

[NP1 0.3 NP4 0.1; NP5 0.6].

It will be noted that there is one element, NP1, in common. Thus the value for NP1 associated with the second print addressable area may change (in this case, as NP1 is not selected and is therefore associated with a positive value in the error vector, the value associated with NP1 may increase) but the other values for the NPac associated with the second print addressable area will remain unchanged as they are not common to both element sets. It may be noted that the modified NPac in this example would therefore add up to a value which is not equal to one. Initial NPacs, which may be the output of a color mapping and separation process will generally sum to one as they define a probability distribution or proportional area coverage. Thus a modified NPac may differ from an initial NPac in this regard. The values therein are still indicative of probabilities, and could be normalised, for example while maintaining the proportions. However, in this example, this is not carried out as the method may iterate by selecting the largest values, which is not dependent on the values summing to 1. In this example, the error is to be diffused to second print addressable area alone, resulting in a modified NPac of:

[NP1 0.5; NP4 0.1; NP5 0.6].

However, as explained below with reference to FIG. 2, it may be the case in other examples that the error is diffused to more than one print addressable area.

Thus, in this example, the error is diffused to the possible print material or material combinations already defined for the candidate error diffusion print addressable area, and not with respect to other elements in the first set. In other words, an error diffusion technique implemented according to the method of FIG. 1 may alter the weights of the probability distributions in a print material coverage vector for a second print addressable area without altering its composition. This means that the domain of printing states is preserved and ensures that no print material/print material combination can be selected unless it is initially defined for a print addressable area in the initially input data representing the image or object. This may result in increased sharpness, for example in relation to relatively fine details such as lines, hashes, patterns, edges and the like, which may be blurred, result in noise or dissolution of a pattern if error diffusion is carried out such that the error for every element is diffused, even if these elements were not previously represented in the candidate error diffusion print addressable area element set. Furthermore, the data will not increase in size during processing. To consider an alternative, if the error above is 'fully' diffused to the second NPac, the error diffused NPac would have five elements:

[NP1 0.5; NP2 −0.5; NP3 0.3; NP4 0.1; NP5 0.6].

Thus, the representation of that [x,y] location would occupy more memory after error diffusion than before. In the example above, however, the elements of the set are unchanged and thus the memory space occupied may also be unchanged. This can increase memory efficiency and reduce usage, for example avoiding any need for dynamic memory allocation and the like. It may also be the case that, in some examples, an element which is not in the original element set for the second print addressable area (NP2 or NP3 in this example) may be associated with the highest probability, and may be selected even though selection of that element may not be contemplated in the original element set for the second print addressable area.

This method therefore preserves the original selection of the possible print materials while changing the weighting. In preserving the original element set, the method may provide an alternative to halftoning using a halftoning matrix and may in some examples result in a different output. For example, the methods set out herein may better preserve lines and detailed features than a halftoning matrix which is designed for image or object properties of varying angles and thickness, or may avoid provision or multiple halftone matrices optimised for different portions of the input data.

Figure 2:
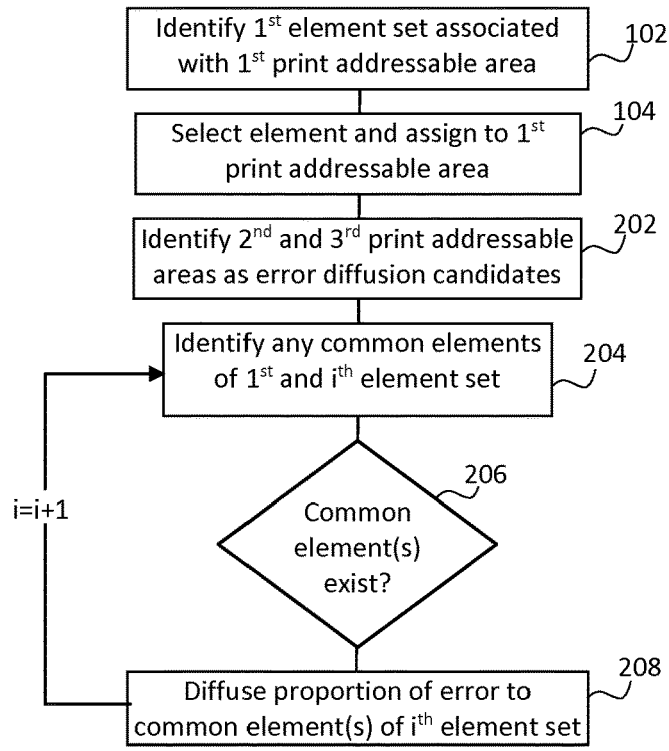
FIG. 2 is a flowchart of another example method of error diffusion.

FIG. 2 shows another example of a method, in this case setting out an example of a method for carrying out error diffusion to a plurality of print addressable regions, with proportions (for example, a share) of the error being assigned to each of the plurality. Blocks 102 and 104 are carried out as described in relation to FIG. 1. In block 202, a second and a third print addressable area are identified as a candidate print addressable area for error diffusion, the second and third print addressable areas being associated with a second and third element set respectively. In a first loop (i=2), common elements of the first element set and the second element set are identified (block 204) and, if at least one common element is identified (block 206), a proportion of the error is diffused to the common element(s) in block 208. This loop is then repeated for the third element set. The proportion may be different for each print addressable area.

In some examples, diffusing the error to a print addressable area comprises weighting the values of an error vector with a weighting for that print addressable area and combining the weighted values of the common elements of an error vector and the material coverage vector for that print addressable area.

It may be the case that candidate print addressable areas for error diffusion are selected to be near neighbors, for example sharing at least one corner, edge or face with the first print addressable area, or within a particular area count of the first print addressable area. This may reduce blurring associated with error diffusion.

In other examples, there may be more than two candidate print addressable areas considered. For example, the error may be diffused according the 'Floyd Steinberg' approach which uses a serpentine traversal of the addressable areas, where the error is weighted differently to four of the neighboring print addressable areas (right, right-down, down, left-down). The proportions or weights applied for each area may be predetermined (for example, being seven sixteenths to the area to the right, five sixteenths to the area to the right and down, three sixteenths to the area below and one sixteenth to the area below and left). In other examples alternative area selections may be made, and/or alternative relative proportions applied.

To consider a particular example, if the first, second and third print addressable area are originally associated with print coverage representations of the form:

1st print addressable area: [NP1 0.2; NP2 0.5; NP3 0.3];
2nd print addressable area: [NP1 0.3 NP4 0.1; NP5 0.6];
3rd print addressable area: [NP2 0.2 NP3 0.3; NP5 0.5].

An error vector may be determined as described above as:

[NP1 0.2; NP2 −0.5; NP3 0.3].

This is then proportionally distributed to the second and third print addressable area; in this example with x/n of the error being diffused to the second addressable area and (n−x)/n being diffused to the third print addressable area (where x and n are any number).

The print coverage representation for the second and third print addressable area are therefore transformed to become:

2nd print addressable area (including error): [NP1 0.3x/n; NP4 0.1; NP5 0.6];
3rd print addressable area (including error): [NP2 0.2(n−x)/n; NP3 0.3(n−x)/n; NP5 0.5].

The method may be iterated, for example according to space-filling (for example, boustrophedonic) path through the spatial arrangement of the print addressable areas. For example, an element from the second element set (the weights of the elements of which may have modified by the error diffusion if it has elements in common with the first print addressable area) may be selected and assigned to the second print addressable area. A fourth print addressable area may be selected as a candidate print addressable area for error diffusion, the fourth print addressable area being associated with a fourth element set; and the process as described above (i.e. any common elements of the second element set and the fourth element set may be identified; and, if at least one common element is identified, at least a portion of an error associated with the selection of the element from the second element set to the identified common elements of the fourth element set). Thus, in this way, the error may be diffused in a cumulative manner, but weighted area coverages which are accumulated pertain to the elements which are predetermined for each print addressable area.

Such an example may comprise determining an error vector based on a material coverage vector (which may, in some examples, have been modified by error diffusion) and the assigned element, the error vector having the second element set. A material coverage vector associated with the fourth print addressable area may be transformed to an error diffused material coverage vector for the fourth print addressable area by combining the values of the common elements of the error vector and the second material coverage vector, the error diffused material coverage vector for the fourth print addressable area having the forth element set.

It will be understood that the terms 'first,' 'second,' 'third,' and 'fourth' as used herein in relation to the print addressable areas and their elements sets are purely provided as labels to aid understanding of the methods and apparatus described herein. Thus, for example, a print addressable area which undergoes processes described in relation to the second print addressable area may be associated with actions described in relation to the first addressable area in a subsequent process. Moreover (for example when using Floyd-Steinberg error diffusion principles), an element set associated with a particular print addressable area may undergo several transformations as the error of each selection is propagated though the input data.

Thus, while the methods of FIGS. 1 and 2 may initially be applied to at least one print addressable area defined in input image or object data, they may be applied in subsequent iterations to print addressable areas having associated data related to element sets which has been modified by error diffusion.

Figure 3:
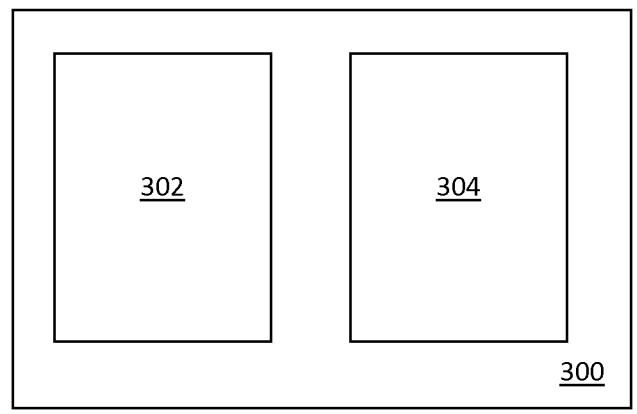
FIG. 3 is a simplified schematic of an example processing apparatus.

FIG. 3 is an example of a processing apparatus 300 comprising a material selection module 302 and an error diffusion module 304.

The modules 302, 304 may be implemented with one or a plurality of processors executing machine readable instructions stored in a memory, or a processor operating in accordance with instructions embedded in logic circuitry.

The material selection module 302 receives data for use in printing (e.g. image or object data). For example the data may characterise at least one print addressable areas, each associated with a respective element set, wherein each element is associated with print material or print material combination. The material selection module 302 selects, from a predetermined first set of elements (for example, an ink vector, an NPac or an Mvoc as described above, which may be from input print data) an element for a first print addressable area (for example a pixel or a voxel). Each element may be associated with a print material or print material combination, either explicitly or implicitly, for example via a mapping or look up table. In some examples, the elements of a set of elements are associated with a probability and the material selection module 302 is to select the element of an element set associated with the highest probability within the set.

The error diffusion module 304 diffuses an error associated with the selection from the first set of elements to at least a second print addressable area associated with a predetermined second set of elements characterised in data for use in printing. This may be the same data as the data received by the material selection module 302 or a distinct data set (for example, each pixel/voxel and its associated element set may be treated as a separate data portion). The error is diffused to any common element(s) of the first and second set and the set of elements associated with the second print addressable area is unchanged. In some examples, the error diffusion module 304 is to diffuse a proportion of the error to any common element(s) of each of a plurality of print addressable areas.

In some examples, the error diffusion process carried out is iterative. For example, after the error has been diffused (i.e. if common elements have been identified) to the second print addressable area, the material selection module 302 may select an element of the second print addressable area having an error diffused thereto, and the error diffusion module 304 may diffuse an error associated with the selection from the second set of elements to at least a third print addressable area associated with a predetermined third set of elements, wherein the error is diffused to any common element(s) of the second and third set, and the set of elements associated with the third print addressable area is unchanged.

Figure 4:
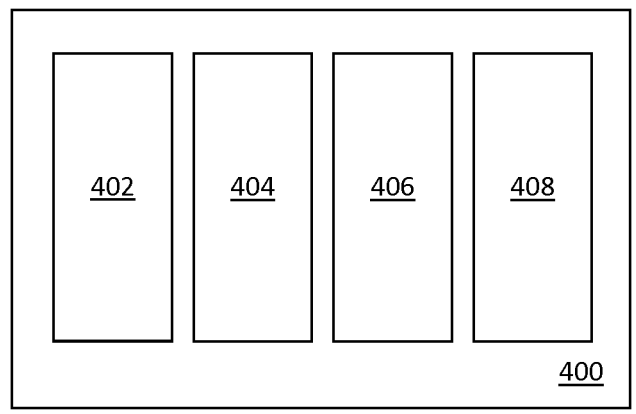
FIG. 4 is a simplified schematic of another example processing apparatus.

Another example of a processing apparatus 400 is shown in FIG. 4. This example comprises a material selection module 402 and an error diffusion module 404, which be operated according to any of the principles described in relation to the material selection module 302 and error diffusion module 304 of FIG. 3.

In this example, the processing apparatus 400 further comprises a control data module 406 and a print apparatus 408. The material selection module 402, error diffusion module 404 and control data module 406 may be implemented with one or a plurality of processors executing machine readable instructions stored in a memory, or a processor operating in accordance with instructions embedded in logic circuitry. It is noted that in at least one example described herein, the term "module" refers to a hardware component of the apparatus.

The control data module 406 determines print control data comprising instructions for the print apparatus 408 to print using the materials or material combinations specified by selected elements in each print addressable area. The print apparatus 408 carries out a print operation (which may be two dimensional or three dimensional print operation) according to the control data.

Figure 5:
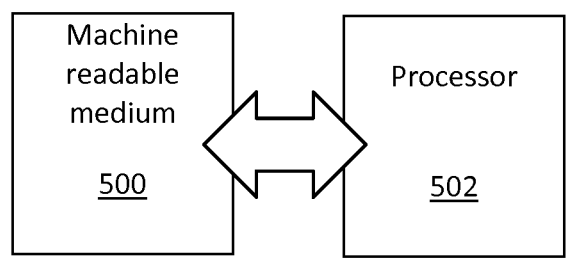
FIG. 5 is a simplified schematic of an example non-transitory machine readable medium associated with a processor.

FIG. 5 shows an example of a non-transitory machine readable medium 500 associated with a processor 502. The machine may refer to a processor or a processing apparatus. The non-transitory machine readable medium 500 comprises instructions which, when executed by the processor 502, cause the processor 502 to determine print instructions from received print input data, the received print input data comprising, for each of a plurality of print addressable areas, data indicative of at least one possible print instruction, wherein determining print instructions comprises selecting one of the possible print instructions for each print addressable area. The print input data may for example comprise image data or object model data. The plurality of possible print instructions may for example be expressed within a print material coverage representation such as a print material coverage vector, or may be represented in some other way. The possible print instructions for a print addressable area may comprise a set of elements, each element representing a print material or print material combination.

The instructions cause the processor 502 to determine print instructions using error diffusion, wherein error diffusion is carried out such that the possible print instructions associated with each print addressable area is unchanged (for example, an element set which makes up a print material coverage vector remains the same).

In some examples, the instructions may, when executed thereby, cause the processor 502 to determine print instructions for three-dimensional printing. When used for three-dimensional printing, (as for two-dimensional printing), use of the methods set out herein may mean that over print region that has as certain set of possible values (e.g., associated with an Mvoc, itself made up of predetermined elements specifying print materials and material combinations (which elements may be termed material vectors, or Mvecs), no other Mvecs are used other than those initially specified. As noted above, this may avoid 'blurring' at the edges/interfaces to other volumes which can be caused by error diffusion, and therefore result in effective preservation of edges, which may comprise relatively small spatial elements in three dimensions. Moreover, in three dimensional printing, the print materials may be intended to impart physical properties such as strength, resilience and the like. By way of example, the print materials may chemical agents, and it may be intended to carefully control chemical properties or reactions by placing certain agents which may have a chemical interaction with others. In such examples, printing a voxel with a material which is not in the initial Mvoc may affect the chemical (or other) properties of a printed three-dimensional objects.

Examples in the present disclosure can be provided as methods, systems or machine readable instructions, such as any combination of software, hardware, firmware or the like. Such machine readable instructions may be included on a non-transitory machine (for example, computer) readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, or a module thereof, may execute the machine readable instructions. Thus functional modules of the apparatus 300, 400 (for example, either material selection module 302, 402, either error diffusion module 304, 404, or the control data module 406) and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
using at least one computer, identifying, within data for use in printing, a first element set associated with a first print addressable area, the first element set comprising at least one element, wherein each element of the element set is associated with a print material or print material combination,
selecting, using the at least one computer, an element from the first element set and assigning the element to the first print addressable area;
identifying, using the at least one computer, a second print addressable area as a candidate print addressable area for error diffusion, the second print addressable area being associated with a second element set;
identifying, using the at least one computer, any common elements of the first element set and the second element set; and, if at least one common element is identified;
diffusing, using the at least one computer, an error associated with the selection of the element from the first element set to the at least one identified common element of the second element set.

2. A method according to claim 1 in which the first and second element sets comprise, respectively, first and second material coverage vectors, in which each element of the element set is associated with a value indicating a probability that the print material or print material combination identified by the element is applied to a print addressable area;
wherein diffusing the error comprises:
determining an error vector based on the first material coverage vector and the assigned element, the error vector having the first element set, and
transforming the second material coverage vector to an error diffused material coverage vector by combining the values of the at least one common element of the error vector and the second material coverage vector, the error diffused material coverage vector having the second element set.

3. A method according to claim 2 in which determining an error vector comprises subtracting a vector having the first element set in which the selected element has a value of 1 and the other elements have a value of 0 from the first material coverage vector.

4. A method according to claim 2 in which selecting an element from the first material coverage vector comprises selecting the element of the element set associated with the highest probability.

5. A method according to claim 2 in which transforming the second material coverage vector comprises weighting the values of the error vector and combining the weighted values of the common elements of the error vector and the second material coverage vector.

6. A method according to claim 1 further comprising identifying, using the at least one computer, a third print addressable area as a candidate print addressable area for error diffusion, the third print addressable area being associated with a third element set;
identifying any common elements of the first element set and the third element set; and, if at least one common element is identified; and
diffusing a proportion of error associated with the selection of the element from the first element set to the at least one identified common element of each of the second element set and the third element set.

7. A method according to claim 1, comprising selecting, using the at least one computer, an element from the second element set and assigning the element to the second print addressable area;
identifying a fourth print addressable area as a candidate print addressable area for error diffusion, the fourth print addressable area being associated with a fourth element set;
identifying any common elements of the second element set and the fourth element set; and, if at least one common element is identified;
diffusing an error associated with the selection of the element from the second element set to the at least one identified common element of the fourth element set.

8. A method according to claim 1 in which the second print addressable area is a spatial neighbor of the first print addressable area.

9. A processing apparatus, comprising:
a material selection module and an error diffusion module, wherein the material selection module is to:
receive data for use in printing, the data characterising at least one print addressable area associated with a respective element set, wherein each element is associated with print material or print material combination, and
select, from a predetermined first set of elements, an element for a first print addressable area; and
the error diffusion module is to diffuse an error associated with the selection from the first set of elements to at least a second print addressable area characterised in data for use in printing and associated with a predetermined second set of elements, wherein the error is diffused to at least one common element of the first and second set, and the set of elements associated with the second print addressable area is unchanged.

10. The processing apparatus according to claim 9 in which the elements of a set of elements are associated with a probability, the material selection module is to select the element of an element set associated with the highest probability of the probabilities of the set of elements, and the error diffusion module is to diffuse an error by changing the probability associated with at least one element of a set of elements.

11. The processing apparatus according to claim 9 in which the error diffusion module is to diffuse a proportion of the error to at least one common element between the first element set and an element set of each of a plurality of print addressable areas.

12. The processing apparatus according to claim 9, further comprising a control data module to determine print control data comprising instructions for a print apparatus to print using the print materials or print material combinations specified by selected elements in each print addressable area.

13. The processing apparatus according to claim 12, further comprising a print apparatus to carry out a print operation according to the print control data.

14. A non-transitory machine readable medium comprising instructions which, when executed by a processor, cause the processor to:
determine print instructions from received print input data, the received print input data comprising, for each of a plurality of print addressable areas, data indicative of at least one possible print instruction, wherein determining print instructions comprises selecting one of the possible print instructions for each print addressable area, and
determine print instructions using error diffusion, wherein error diffusion is carried out such that the possible print instructions associated with each print addressable area is unchanged.

15. The non-transitory machine readable medium according to claim 14 wherein the instructions further cause the processor to determine print instructions for three-dimensional printing.

* * * * *